United States Patent [19]

Bedard et al.

[11] Patent Number: 4,586,175
[45] Date of Patent: Apr. 29, 1986

[54] METHOD FOR OPERATING A PACKET BUS FOR TRANSMISSION OF ASYNCHRONOUS AND PSEUDO-SYNCHRONOUS SIGNALS

[75] Inventors: Charles J. Bedard, Los Altos; Prem C. Jain, Fremont; Samuel F. Wood, Los Altos, all of Calif.

[73] Assignee: Northern Telecom Limited, Montreal, Canada

[21] Appl. No.: 605,722

[22] Filed: Apr. 30, 1984

[51] Int. Cl.[4] ............................................. H04J 3/26
[52] U.S. Cl. ..................................... 370/85; 370/94; 340/825.5
[58] Field of Search ..................... 370/94, 85, 89, 90, 370/95, 96; 340/825.5, 825.51

[56] References Cited

U.S. PATENT DOCUMENTS

| | | | |
|---|---|---|---|
| 3,985,962 | 10/1976 | Jones et al. | 370/90 |
| 4,154,983 | 5/1979 | Pedersen | 370/89 |
| 4,251,880 | 2/1981 | Baugh et al. | 370/89 |
| 4,413,337 | 11/1983 | Dauphin et al. | 370/94 |
| 4,446,555 | 5/1984 | Devault et al. | 370/95 |
| 4,516,239 | 5/1985 | Maxemchuk | 370/94 |

Primary Examiner—Douglas W. Olms
Attorney, Agent, or Firm—Schwartz, Jeffery, Schwaab, Mack, Blumenthal & Evans

[57] ABSTRACT

Data transactions and voice communications are facilitated in a packet switching system including a group of ports each of which is capable of exchanging inter-destined and intra-destined information signals via a packet bus. The packet bus is operated under the direction of a bus controller which communicates with the ports to arbitrate access to the packet bus for packet transmission. Arbitrating access to the packet bus for pseudo-synchronous and asynchronous signal communications includes the steps of polling the ports within a period of time for high and low priority, transmission requirements. In response to each high priority requirement transmission over a predetermined number of consecutive bus cycles is granted by the bus controller within a predetermined period of time for pseudo-synchronous transmission of signals from each of the corresponding ports one after another. In response to each lower priority requirement, transmission over an indefinite number of consecutive bus cycles is granted by the bus controller for asynchronous transmission of signals from at least one of the corresponding ports. The preceding steps are repeated with a frequency such that high priority grants occur at a uniform rate that is consistent with a sampling rate of digitized voice communications being divided by one less than the predetermined number of consecutive bus cycles.

5 Claims, 2 Drawing Figures

METHOD FOR OPERATING A PACKET BUS FOR TRANSMISSION OF ASYNCHRONOUS AND PSEUDO-SYNCHRONOUS SIGNALS

FIELD OF THE INVENTION

The invention is in the field of communications systems and more particularly relates to an information communication packet busing system for transferring packetized information signals between various ports connected to a packet bus.

BACKGROUND OF THE INVENTION

The technology of telephone communications has evolved over a period of time during which telephony voice communication has been of primary concern. Telephony voice communication has been traditionally provided via circuit switched telephone facilities. Circuit switched facilities are characterized in that a circuit or a communication path is separately dedicated to each active telephone conversation throughout the entire duration of the telephone conversation. More recently communication paths have been more economically provided by respectively assigned channels in a time division multiplex (TDM) telephone exchange.

It is only in the last twenty years or so that consideration and requirements for communication systems capable of carrying a rapidly growing volume of data communication has had any significant impact on the production of communications systems in general. In contrast to the circuit switched design philosophy of telephone voice communications systems, more economical data transmission systems are typically based on a packet switching design philosophy. Packet switching is characterized in that a circuit or communication path is exclusively committed to various of data transactions one after another. Each data transaction occupies the communication path for a time which is consistent with the volume of the data divided by the bandwidth of the communication path.

Synchronous communications are most efficiently handled by circuit switched facilities. Each synchronous communication occupies a communication path or channel for the full duration of the communication without regard to utilization of bandwidth. Asynchronous communications are most efficiently handled by packet switched facilities. Each asynchronous communication, sometimes referred to as a transaction, utilizes the full bandwidth of a circuit path for only as much time as data volume divided by the bandwidth requires. Asynchronous data transmitted via circuit switched facilities seldom utilize the available bandwidth. In packet switched facilities if traffic is present the full bandwidth is used. However because of the asynchronous nature of information transfer between ports in a packet switched system, attempts to use this type of system for voice i.e. synchronous information transfers, have resulted in relatively intricate and complicated solutions which typically exhibit lesser performance than is practically acceptable. An extensive summary of the capabilities and consequences of packet switching and various exemplary systems has been documented by Roy D. Rosner under the title of "Packet Switching Tomorrow's Communications Today" and published by Lifetime Learning Publications, a division of Wadsworth, Inc., in Belmont, Calif.

It is apparent that asynchronous data information is inefficiently communicated by circuit switched facilities. Furthermore holding times for asynchronous data transmission in a circuit switched facility can greatly exceed the typical duration of a voice telephone conversation. Thus extensive data traffic tends to seriously congest the typical circuit switched network. It is also apparent that currently available packet switching facilities are not a practical alternative to circuit switched facilities for voice-like information as receiving delays are typically too long, and even worse are inconsistent. Thus in both public and private communications systems circuit switched facilities are typically provided. Where the occasion warrants, packet switching is provided as a separate network exclusively for asynchronous data communications.

SUMMARY OF THE INVENTION

Data transactions and voice conversations are facilitated in a switching apparatus common to both. More particularly a packet switching communication system includes a plurality of ports which are capable of exchanging inter-destined and intro-destined information signals via a packet bus. The packet bus is operated in combination with the ports under the direction of a bus controller which communicates with the ports via a control portion of the packet bus. The bus controller regulates occurrences of transmissions on a transfer portion of the packet bus.

In accordance with the invention a method of arbitrating access to the packet bus for transmission of signals of both sychronous and asynchronous natures between the ports includes the steps of:

(a) defining bus cycles each being of a set time interval for transmission of one word of the signals;

(b) within a predetermined period of time, polling each of the ports one after another for an indication of a transmission requirement of high priority and polling at least some of the ports one after another for an indication of a transmission requirement of lower priority;

(c) in response to each indication of high priority, granting the transfer portion for up to and including a predetermined number of consecutive bus cycles within a said predetermined period time for pseudosynchronous transmission of signals from one corresponding port after another;

(d) in response to each indication of lower priority, granting the transfer portion for up to and including an indefinite number of consecutively occurring one of the bus cycles for asynchronous transmission of signals from at least one of the corresponding ports; and (e) repeating the preceding steps with a frequency sufficient to provide transfer of information of a communication in step (c).

In one embodiment a packet bus is operated to provide asynchronous and pseudo-synchronous information signal transfers between packet bus ports in a communication system. The packet bus ports include at least one bus interface unit connected to the packet bus for exchanging information signals between the packet bus and a terminal interface circuit. At least one other bus interface unit is connected to the packet bus for exchanging information signals between the packet bus and a call controller. A bus controller is connected to the packet bus for regulating transfer occurrences of the information signals. The operation of the packet bus includes the following steps. In the bus controller signals representing periodic frame intervals are generated such that each defines a predetermined period of time which includes a predetermined number of packet bus cycles. Via address and control portions of the packet bus the bus controller firstly polls all of the bus interface units, one after another, for a high priority synchronous information transfer requirement. Secondly the bus controller polls in sequence bus interface units one after another for a lower priority asynchronous information transfer requirement. Thirdly the bus controller makes a record of the last lower priority polled bus interface unit at the end of the instant frame interval for use as a start point for a continuation of lower priority polling in a subsequent frame interval. In one of the bus interface units in response to a polling address corresponding to a unique address of the bus interface unit and a presence of information destined for at least a one of the bus interface units and being of a priority corresponding to a priority of the polling, transmitting a request signal via the control portion of the packet bus to the bus controller. In the bus controller, individual grant signals are transmitted, consistent with availability of the transfer portion of the packet bus, one after another to all of the bus interface units which have responded with a high priority request signal. The transmission of each high priority grant signal occurs within the same frame interval as the occurrence of the high priority request signal. Thereafter lower priority grant signals are transmitted consistent with availability of the transfer portion of the packet bus, as indicated by a done signal. The lower priority grant signals are transmitted, one after another, to at least some of the bus interface units which have responded with a lower priority request signal as long as there is time remaining within the periodic frame interval. At each of the bus interface units having been polled, having requested, and having been granted, destined information signals are transmitted via the transfer portion of the packet bus. Each such transmission is preceded by transmission of destination defining address signals. These signals are transmitted via the transfer portion of the packet bus. In the instance of the grant signal being a high priority, the series of bus cycles for any one transmission is of a predefined length. In the instance of the grant signal being a lower priority, the series of bus cycles is of variable length. The end of a low priority transmission is marked by the previously mentioned done signal which is generated in the transmitting bus interface unit of the instant. Each of the bus interface units monitors the transfer bus for an occurrence of a word corresponding to its unique address during a bus cycle of predetermined time relationship with each occurrence of a grant signal, and in response to an occurrence of its unique address, thereafter with each bus cycle receives information signals from the transfer bus until another occurrence of either of the grant signal or the done signal.

BRIEF DESCRIPTION OF THE DRAWINGS

An example embodiment of the invention is described with reference to the accompany drawings in which.

DETAILED DESCRIPTION OF THE INVENTION

Figure 1:
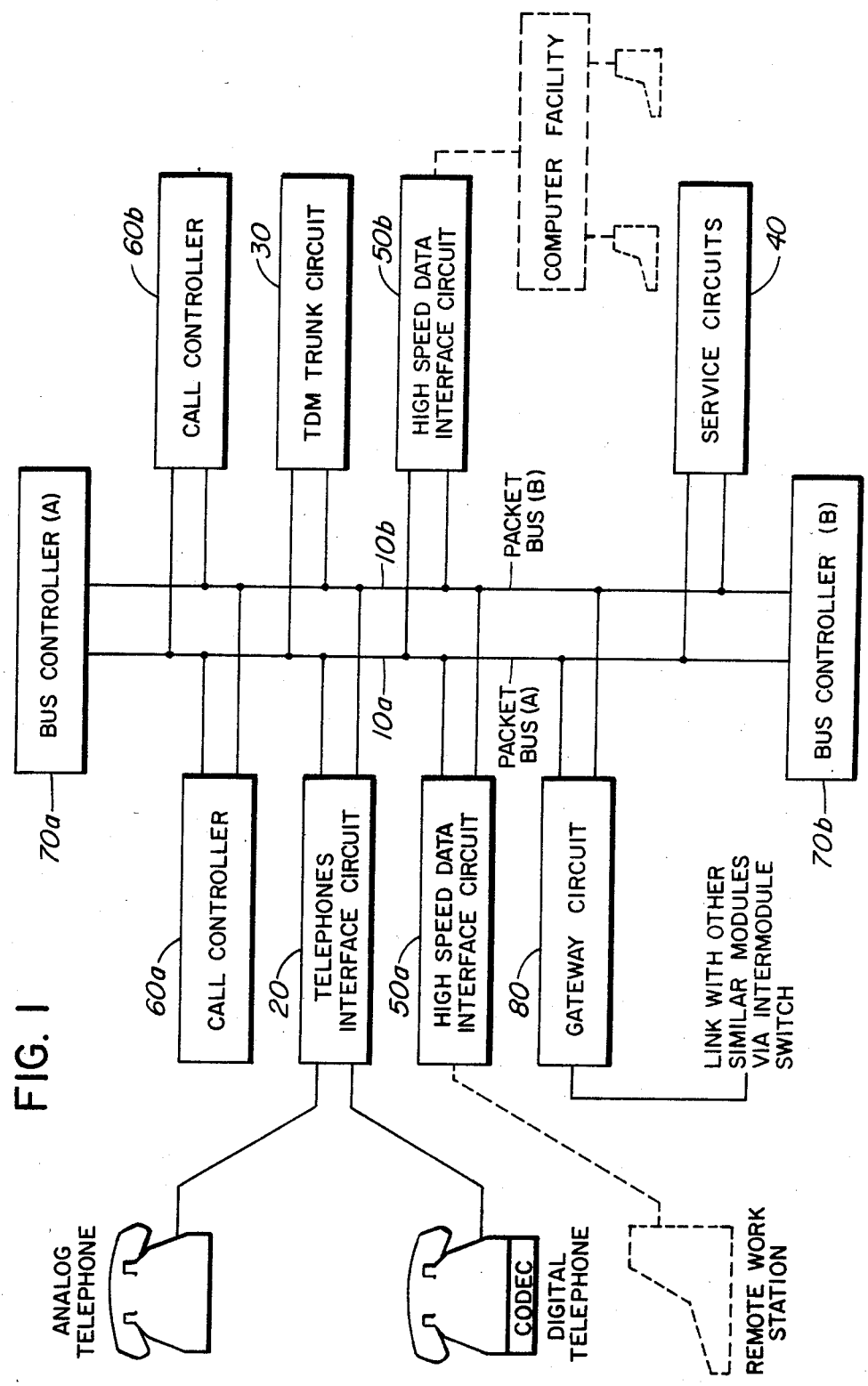
FIG. 1 is a schematic block diagram of a communication system.

The structure of the communication system in FIG. 1 permits a wide range of system size.

The system may consist of a single module similar to that in FIG. 1 or it may include a collection of modules, interconnected by intermodule switches (not shown). This description concerns only one module which by itself is representative of the communication system in FIG. 1. The module includes two packet buses 10a and 10b consisting of parallel leads being grouped into address, control and transfer portions. The module may be viewed as a collection of elements for example a synchronous line telephone interface circuit 20, a synchronous TDM trunk circuit 30, services circuits 40, asynchronous data circuit 50a and 50b, call controllers 60a and 60b and bus controllers 70a and 70b and an asynchronous gateway circuit 80, all of which are connected to packet buses 10a and 10b. The packet buses and the call and bus controllers are duplicated solely for reliability. Binary signals arranged in a packet format are used for information transfers between the elements via the transfer portion of an active one of the packet buses 10a or 10b. The packets are of fixed and variable word lengths corresponding to higher and lower priorities of information transfer respectively. Packets representative of voice signals are of higher priority and packets representing other types of information, for example data for signalling are typically of lower priority. Under the supervision of an active one of the bus controllers, for example controller 70a, the transfer portion of the packet bus 10a provides a path for orderly packet communication. In this example this path is sixteen leads wide such that each word of a packet consists of sixteen binary signal bits. The active bus controller exercises supervison of the units via address and control portions of the active packet bus.

Figure 2:
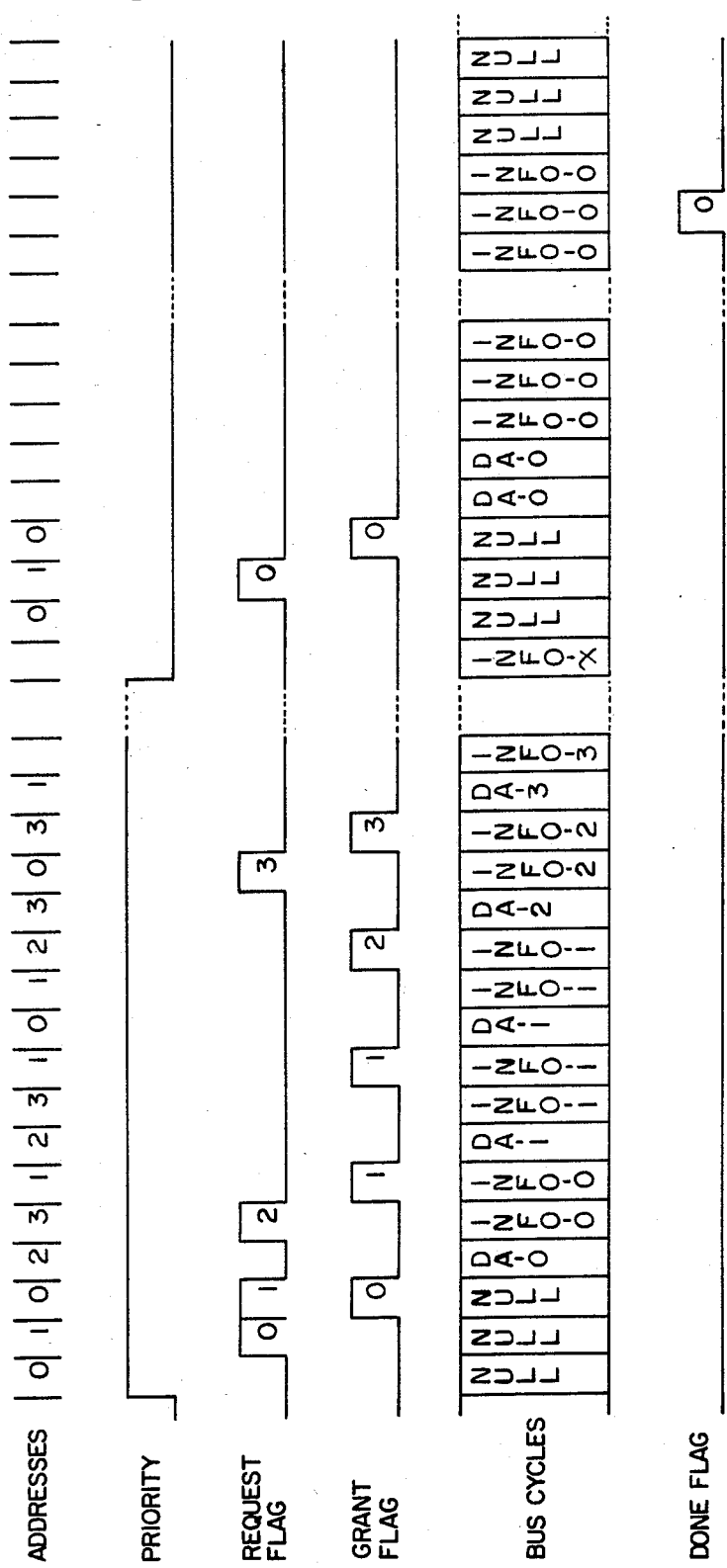
FIG. 2 is a timing diagram illustrating a sequential method of operating a packet bus in the communication system of FIG. 1.

FIG. 2 is illustrative of signals involved in operation of a four address system. This example illustrates the use of only four addresses for the sake of brevity and ease of understanding. Referring to FIG. 2, the active bus controller generates plural bit ADDRESSES coincident with a priority signal being high to define polling of units for the higher priority signal transfer requirement. When the PRIORITY signal is low it defines polling for the lower priority signal transfer requirement.

Packet lengths are always an integer number of n bit words, in one example, 16-bit words. The length of a packet depends on both the type of communication and the amount of information. The bus controllers and the units are arranged to operate with two distinct classes of packets, short packets and long packets. Short packets are always of exact length for example three words long. short packets are primarily used for speudo-synchronous signal transmission. These are high priority signals, for example signals being representative of voice. Short packets can also be used for high priority data signals. Short packets are always transmitted within a tightly-bounded time interval. Long packets are of variable length and are transmitted during a minority portion of each time interval and in addition during each time interval having time remaining but with no short packets left to be transmitted. A long packet minimum length is two words, typically used for a braodcast class of message. This is a message intended for receipt by all of the bus interface units. Long packet maximum length may be limited for example to 64 words to avoid occasional undue delay in other packet transmissions.

The beginning of each packet consists of packet destination address or header. A header is either short or long being one or two words. A short header is used to identify a temporarily assigned destination unit address. A long header consists of two words which identifies a predetermined physical location address of the destination unit and the associated terminating element. The choice of a long or of a short header for a packet is independent of whether the packet is a long or short. However, to minimize overhead it is preferred that short packets have short headers.

The encoding of the header is not constrained except that at least one predefined two-word header must be reserved as a "null" destination address. In the event that no other unit is transmitting on the packet bus, the bus controller transmits the predefined null header on the transfer bus. The format and meaning of the remaining words of a packet, i.e. that following each header, must be agreed upon by the sender and receiver of the packet, for example telephones, work stations, computers, etc.

Polling and granting occurs by way of the control and address portions of the packet bus and packet data transfers occur on the transfer portion of the packet bus. Packet data transfers each require a plurality of BUS CYCLES with a GRANT FLAG marking beginning of each packet. Each BUS CYCLE consists of one of three types of information. A NULL is a destination address indicating a nowhere destination. A DA-X is a destination address having been transmitted from a unit X, in this case X is any number 0 through 3. An INFO-X is an information word having a destinatin indicated by the preceding DA and a source indicated by X, in this case any number 0 through 3. The bus controller generates ADDRESSES and the PRIORITY signal and responds to REQUEST FLAGS to discover which units need to be granted the transfer portion of the packet bus. A unit whose address is asserted in a bus cycle t asserts the REQUEST FLAG during the bus cycle t+1 only if it has at least one packet to send. The bus controller stores the corresponding address so that it can subsequently grant access to the transfer bus for transmission by the unit. The bus controller keeps a backlog of unit addresses in memory for those units which have asserted the REQUEST FLAG but have not yet been granted access to the bus. In this example, units may also produce a congestion flag when it is polled. In the example, a unit selected by the address lines during bus cycle t, may then assert the congestion flag during bus cycle t+1 if it has detected a tendancy to overflow since the last time it was addressed.

The bus controller provides a GRANT FLAG signal to a waiting unit whenever the packet bus is about to become idle. For example, suppose a unit is sending an n-byte packet during bus cycles t+1 through t+n. As shown in FIG. 2, the sending unit signals the end of the packet by asserting a DONE FLAG during bus cycle t+n−1, that is at word n−1 of the packet. This gives the bus controller a short time to take action in bus cycle t+n to grant the packet data bus to a waiting unit. In particular, during cycle t+n the bus controller selects the waiting unit with its ADDRESS and also asserts the GRANT FLAG. The thus identified unit begins sending a packet during cycle t+n+1, that is immediately following the preceding packet.

Although the bus is used for granting at one instance in time polling may also take place at the same instance in time. When a unit is selected by the address lines while the GRANT FLAG is not asserted during bus cycle t, the unit asserts a REQUEST FLAG during by cycle t+1 only if it has at least one packet to send. On the other hand, a unit that is selected by the address lines while the GRANT FLAG is asserted during bus cycle t also asserts the REQUEST FLAG during bus cycle t+1 in the event that if it has at least two packets to send. In this way, when the data bus portion of the packet bus is granted, the unit indicates whether it has any packets in addition to the one it is about to send. If the unit has additional packets. The bus controller may grant the unit access to the transfer bus again.

What is claimed is:

1. A method of arbitrating access to a packet bus for transmission of signals of both synchronous and asynchronous natures between a plurality of ports connected thereto, comprising the steps of:
(a) defining bus cycles each being of a set time interval for a transmission of a word portion of said signals;
(b) polling each of said plurality of ports one after another for an indication of a transmission requirement of high priority and polling at least some of the ports one after another for an indication of a transmission requirement of lower priority:
(c) in response to each indication of high priority, granting the packet bus for up to and including a predetermined number of consecutively occurring ones of said bus cycles, wherein said predetermined number of bus cycles occur within a predetermined period of time, for transmission of signals from ports indicating a transmission requirement of high priority;
(d) in response to each indication of lower priority, granting the packet bus for an indefinite number of consecutively occurring ones of said bus cycles, said indefinite number of cycles ocurring within said predetermined period of time, for asynchronous transmission of signals from at least one port indicating a transmission requirement of a lower priority; and
(e) repeating steps (a) through (d) at a frequency sufficient to provide transfer of information of a communication in step (c).

2. A method of arbitrating access to a packet bus as defined in claim 1 wherein the step of granting the packet bus is repeated at a rate at least sufficient for digitized voice communication.

3. A method of arbitrating access to a packet bus as defined in claim 2 wherein the number of bus cycles in step (d) is limited to a predetermined maximum.

4. A method of arbitrating access to a packet bus as defined in claim 1 wherein step (c) is performed exclusively for a first group of the ports within a first portion of the predetermined period of time, and wherein step (c) is subsequently performed exclusively for a second group of ports within a second portion of the predetermined period of time,
whereby regularity of pseudo-synchronous signal transmission via the packet bus is enhanced.

5. A method of operating a packet bus to provide asynchronous and pseudo-synchronous information signal transfers in a communication system comprising at least one bus interface unit connected to the packet bus for exchanging information signals between the packet bus and a terminal interface circuit, at least one bus interface unit connected to the packet bus for exchanging information signals between the packet bus and a call processor, and a bus controller connected to the packet bus for regulating transfer occurrences of said information signals, the method comprising the steps of:

in the bus controller, generating periodic frame intervals, each of said intervals being of a predetermined period of time and each of said intervals defining a predetermined number of packet bus cycles, via address and control portions of the packet bus;

firstly, polling all of the bus interface units, one after another, for a high priority pseudo-synchronous information transfer requirement;

secondly, polling in sequence bus interface units one after another for a lower priority asynchronous information transfer requirement;

and thirdly, making a record of the last lower priority polled bus interface unit at the end of the instant frame interval for use as a start point for a continuation of lower priority polling in a subsequent frame interval;

in one of the bus interface units, in response to a polling address corresponding to a unique address of a bus interface unit and a presence of information destined for at least one bus interface unit, said information being of a priority corresponding to a priority of the polling, transmitting a request signal via the control portion of the packet bus to the bus controller;

in the bus controller, transmitting grant signals, consistent with availability of the transfer portion of the packet bus, one after another to all bus interface units which have responded with a high priority request signal, the transmission of each grant signal being within the same frame interval as a corresponding high priority request signal;

thereafter transmitting individual grant signals, consistant with availability of the transfer portion of the packet bus, said availability being indicated by done signals, one after another, from said bus controller to at least some of the bus interface units which have responded with a lower priority request signal, as long as there is time remaining within a current periodic frame interval;

in each of the bus interface units have been polled, requested, and granted, transmitting information signals, said signal being preceded by destination defining address signals, during a series of consecutive bus cycles via the transfer portion of the packet bus, wherein said series consists of a predetermined plurality of bus cycles in the instance of the grant having been a high priority grant and wherein said series consists of a variable number of bus cycles up to a predetermined limit in the instance of the grant having been a lower priority grant;

transmitting a done signal from a bus interface unit during a predetermined bus cycle occurrence before a last bus cycle of the instant information signals transmission;

each of the bus interface units monitoring the transfer portion of the packet bus for an occurrence of a word corresponding to its unique address during a bus cycle of predetermined time relationship with each occurrence of a grant signal, and in response to an occurrence of its unique address during said predetermined time relationship, each bus cycle receiving information signals thereafter from the transfer bus until another occurrence of the grant signal.

* * * * *